(12) United States Patent
Garces et al.

(10) Patent No.: US 6,385,066 B1
(45) Date of Patent: May 7, 2002

(54) METHOD AND SYSTEM FOR DETECTING A ZERO CURRENT LEVEL IN A LINE COMMUTATED CONVERTER

(75) Inventors: Luis Jose Garces, Niskayuna; Vinod John; Peter Claudius Sanza, both of Schenectady; Paul Michael Szczesny, Ballston Lake, all of NY (US)

(73) Assignee: General Electric Corporation, Schenectady, NY (US)

( * ) Notice: Subject to any disclaimer, the term of this patent is extended or adjusted under 35 U.S.C. 154(b) by 0 days.

(21) Appl. No.: 09/702,642

(22) Filed: Nov. 1, 2000

(51) Int. Cl.[7] .............................. H02M 5/42; H02M 7/68
(52) U.S. Cl. ........................... 363/87; 363/54; 363/128
(58) Field of Search ............................ 363/87, 84, 128, 363/129, 54

(56) References Cited

U.S. PATENT DOCUMENTS

| | | | |
|---|---|---|---|
| 3,601,674 A | 8/1971 | Joslyn et al. | 318/318 |
| 3,654,541 A | 4/1972 | Kelley et al. | 318/257 |
| 3,848,165 A | 11/1974 | Heiberger | 318/207 R |
| 3,947,737 A * | 3/1976 | Kimura et al. | 318/257 |
| 4,079,265 A * | 3/1978 | Woodburn | 363/61 |
| 4,247,890 A | 1/1981 | Cutler et al. | 363/137 |
| 4,263,557 A | 4/1981 | Jarvinen | 318/341 |
| 4,290,001 A | 9/1981 | Espelage | 318/811 |
| 4,375,612 A | 3/1983 | Wirth | 318/767 |
| 4,399,395 A | 8/1983 | Espelage | 318/803 |
| 4,475,150 A | 10/1984 | D'Atre et al. | 363/51 |
| 4,511,835 A | 4/1985 | Studtmann | 318/700 |
| 4,567,408 A | 1/1986 | Mitsuhashi et al. | 318/317 |
| 4,766,360 A * | 8/1988 | Haraguchi et al. | 318/732 |
| 4,982,145 A * | 1/1991 | Peterson | 318/594 |
| 5,003,455 A * | 3/1991 | Miller | 363/87 |
| 5,008,608 A | 4/1991 | Unsworth et al. | 318/729 |
| 5,115,387 A | 5/1992 | Miller | 363/54 |
| 5,151,642 A | 9/1992 | Lombardi et al. | 318/779 |
| 5,260,863 A | 11/1993 | Ackermann et al. | 363/88 |
| 5,874,818 A | 2/1999 | Schuurman | 318/439 |
| 6,051,893 A * | 4/2000 | Yamamoto et al. | 307/43 |

\* cited by examiner

*Primary Examiner*—Bao Q. Vu
(74) *Attorney, Agent, or Firm*—Hunton & Williams

(57) ABSTRACT

A method and system for determining zero current level occurrences in a reversible power converter without requiring additional component complexity and costs. A digital controller selectively determines the line to line voltage for the most recently fired thyristor pair. The selected line to line voltage is identified as the bridge reconstruction voltage and is compared against the actual bridge output voltage for the conducting bridge. The difference between the two voltage signals is identified as the bridge error voltage and the sign of its magnitude is indicative of a load current zero level occurrence. A zero current level occurrence happens whenever the bridge error voltage drops below zero. This indication is positive and substantially instantaneous and safely enables the reversal of power flow without the risk of line faults due to cross-bridge short circuits.

20 Claims, 5 Drawing Sheets

METHOD AND SYSTEM FOR DETECTING A ZERO CURRENT LEVEL IN A LINE COMMUTATED CONVERTER

BACKGROUND OF THE INVENTION

The present invention relates generally to devices and systems for controlling and regulating the conversion of power from an AC source to a load, typically a DC motor. More particularly, the present invention relates to devices which control the conduction of controllable rectifier, e.g., thyristor, bridges placed between the source and the motor and methods for monitoring the devices so as to prevent line-to-line faults caused by improper firing of the rectifiers in the bridges.

Motor control systems of the type described above typically include at least one rectifier bridge connecting the motor windings to alternating voltage supply lines. For a conventional three phase motor, each AC phase line is generally coupled to a motor by a pair of connected thyristors. That is, in a three phase system, six thyristors are required to transfer power from the source to the load, each for one half of each phase. A thyristor, such as a silicon controlled rectifier (SCR), is generally defined as a switchable diode controlled by a gate element. Each thyristor presents a relatively high blocking impedance to the flow of electrical energy until it is forward biased by a trigger current being applied to its gate element. A digital control circuit typically determines the proper time to trigger the thryistors during each half-cycle of the supply line voltage. Once a thyristor is triggered by the application of a predetermined current to its gate, the forward blocking impedance is lowered, thereby permitting the flow of electrical energy through the thyristor in the manner of a diode. Once conduction has been enabled, the thyristor cannot be turned off until the current flowing therethrough is reduced to near zero (i.e., makes a zero crossing). This occurs when the load current reaches zero. The amount of power transferred to the motor is controlled by varying the duration of the conduction of the various thyristors. This is done by controlling the firing angle of each thyristor, that is, the point during the AC waveform at which the thyristor is initiated into conduction. The process of switching from thyristor to thyristor is known as commutation.

In reversing systems or regenerative systems, that is, systems which alternatively both receive energy from the source as well as transfer energy to the source, back-to-back thyristor bridges are typically used each having a plurality of back-to-back thyristor pairs connected anode to cathode and cathode to anode. In such systems, it is necessary to accurately determine the instance at which the load current reaches zero in order to control the switching from forward bias to reverse bias modes. Absent such an accurate determination, a fault may occur effectively shorting two AC lines in the circuit when a thyristor in one bridge is conducting while any thyristor in the opposite bridge is also conducting. This kind of fault can severely damage or destroy each of the conducting thyristors. Furthermore, inaccurate measurement of the load zero current level may cause undesirable discontinuities during current reversals that could cause torque pulsations.

As described above, the turn-off point of a thyristor may be determined by measuring the load zero current level. Further, because of the possible deleterious effects of ambiguous zero current level detection, the detection of the zero current level should be made as quickly as possible. Conventionally, this measurement is made either by sensing at least two of the line currents by using AC current transformers, or by measuring the load current directly using a DC current sensor, see for example, U.S. Pat. No. 4,567,408 to Mitsuhashi. Unfortunately, many systems incorporating such power control devices utilize extremely high current/torque bandwidths, that is, currents that range from as high as 1000 amperes to as low as 0.02 amperes. Further, since conventional sensors typically generate an analog value, errors and time delays are generally introduced during the analog to digital conversion necessary to input the measurement into the digital controller. Also, due to cost concerns, the quality of conventional current sensors often limits the accuracy of the zero current level measurement. Because of the breadth of this current range, the various conversion errors and the quality of the sensor, an accurate 100% determination of the zero current level is very difficult to make. Rather, conventional controllers typically assign a zero current level bandwidth (i.e., range of values) to approximate the zero current level.

In addition to the problems and inaccuracies identified above, the amount of inductance presented at the load may also result in very long tails in the current decay, thereby increasing the time required to determine actual zeroing of the load current, and thereby delaying the time at which the reverse bridge may be initiated. All of the limitations described above combine to reduce the maximum bandwidth achievable by the system and increase the risk of shorting out the two bridges during current reversal attempts while the first bridge is still conducting.

U.S. Pat. No. 5,115,387 to Miller discloses a method for detecting thyristor conduction using additional voltage sensing means rather than conventional current sensing means. The additional voltage sensing means operate to determine whether the forward bias voltage across a thyristor exceeds a predetermined threshold voltage. If so, it is assumed that the thyristor is conducting and all thyristors in the opposite bridge are prevented from firing. Similarly, U.S. Pat. No. 3,654,541 to Kelley, Jr. et al. discloses a method for determining thyristor conduction wherein voltage detecting means operates to determine whenever the instantaneous magnitude of voltage across the thyristor exceeds a predetermined threshold level which is higher than the voltage drop across the thyristor when conducting. If so, a signal is generated indicated that the thyristor is not conducting.

Additional prior art attempts to remedy this problem include inserting additional high gain sensors into the system which are used solely for the determination of the load zero current level. Also, other attempts include measuring the voltage across the various thyristors in each bridge with a high frequency current to thereby determine precisely when the bridge stops conducting by sensing the zeroing of the added current. Unfortunately, each of the above attempts require the insertion of additional hardware into the system, thereby increasing the cost and complexity of the system.

Accordingly, there is a need in the art of power control systems for a system and method for accurately and quickly measuring the zero current level of the load so as to decrease the likelihood of cross bridge faults without increasing the cost or complexity of the system.

BRIEF SUMMARY OF THE INVENTION

The present invention overcomes the problems noted above, and provides additional advantages, by providing for a method and system for determining zero current level occurrences in a reversible power converter without requiring additional component complexity and costs. A digital controller selectively determines the line to line voltage for the most recently fired thyristor pair. This line to line voltage is identified as the bridge reconstruction voltage and is compared against the actual bridge output voltage for the conducting bridge. The difference between the two voltages is identified as the bridge error voltage and the sign of its magnitude is indicative of a load current zero level occurrence. A zero current level occurrence happens whenever the bridge error voltage drops below zero. This indication is positive and instantaneous and safely enables reversing power flow without the risk of line faults due to cross-bridge short circuits.

BRIEF DESCRIPTION OF THE DRAWINGS

The present invention can be understood more completely by reading the following Detailed Description of exemplary embodiments, in conjunction with the accompanying drawings, in which.

DETAILED DESCRIPTION OF THE INVENTION

Figure 1:
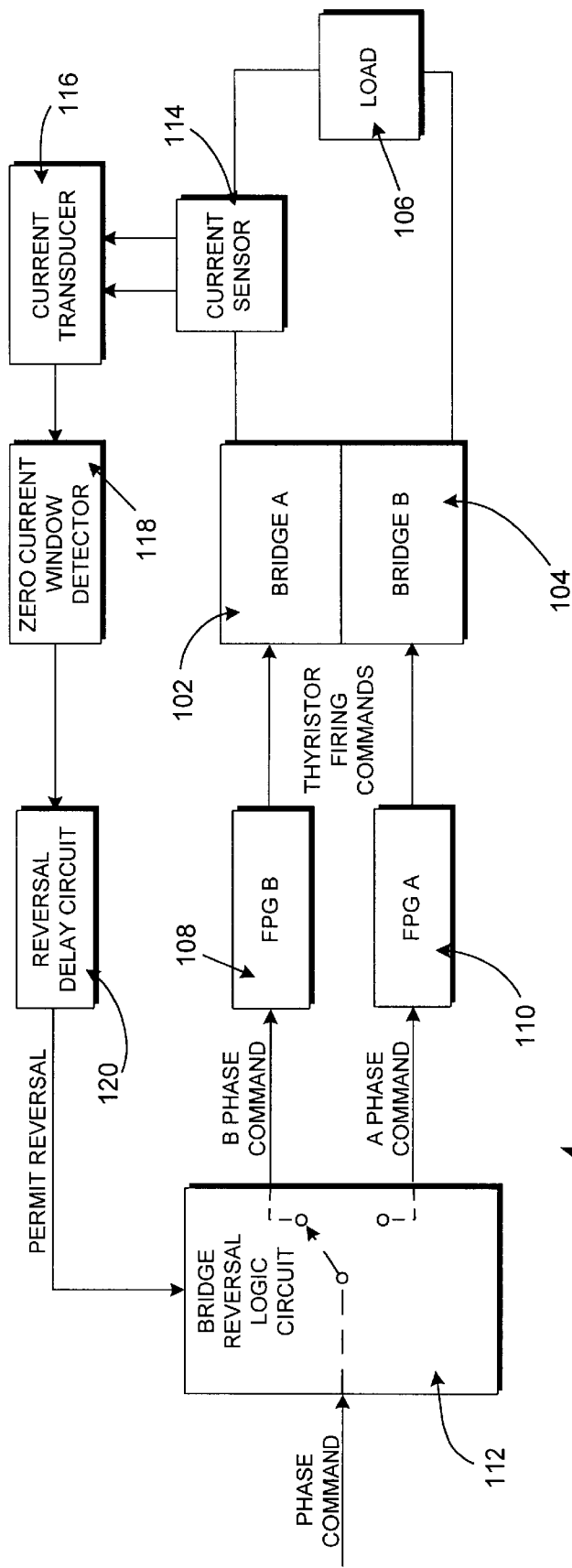
FIG. 1 is a block diagram illustrating a conventional prior art protection circuit utilizing load current sensing.

Referring to the figures and, more particularly, to FIG. 1, there is shown a block diagram illustrating one example of a prior art protection system, generally designated by the numeral 100. As described above, two thyristor bridges 102 and 104 are provided in back-to-back relation so as to control energy flow both to and from the load 106. The gates of the thyristors in the bridges 102 and 104 are triggered by firing pulses which are initiated by firing commands from two firing pulse generators 108 and 110 which, in turn, receive phase commands from a bridge reversal logic circuit 112. A current sensor 114 is coupled between the thyristor bridges 102, 104 and the load 106 and operates to send signals indicative of load current to a current transducer 116. The current transducer then passes signals through a zero current window detector 118 which determines whether or not the measured current is within a predetermined zero window. The zero current window detector 118 is, in turn, coupled to a reversal delay circuit 120 which sends a PERMIT REVERSAL signal indicative of the load current zero status to the bridge reversal logic circuit 112.

In operation, bridge reversal logic circuit 112 selects whether the phase command is in control of bridge 102 firing pulse generator 110 or bridge B firing pulse generator 108. If a bridge reversal is being requested by bridge reversal logic circuit 112, the reversal is delayed until load current transducer 116, zero current window detector 118 and reversal delay circuit 120 collectively determine and indicate that the load current is within the zero window. At that time, the PERMIT REVERSAL signal is generated by the reversal delay circuit 120 and transmitted to bridge reversal logic circuit 112 and the bridge reversal occurs.

As set forth above, a significant disadvantage of the prior art system illustrated in FIG. 1 is that current sensor 114 is not a perfect device. For high performance drives, the peak current provided to the load 106 may be in excess of 1,000 amperes but before transfer of control from one bridge to the other can occur, the current must decrease to less than 0.1 amperes to avoid a damaging short circuit. If a current greater than this amount is present, a line-to-line fault may occur wherein bridge thyristors 102 and 104 may be damaged. Therefore, in order for the system of FIG. 1 to operate effectively, current transducer 116, which processes the output from the current sensor 114, should accurately maintain its zero point within the 10,000:1 resolution range required for optimal operation. Further, zero current window detector 118 is limiting in that it simply determines that the output of current transducer 114 is within a predetermined zero window, that is, that the output of current transducer 114 is close to zero. Conventionally, the detection band in zero current window detector 118 is made sufficiently wide to account for drift and other inaccuracies in current sensor 114 and current transducer 116. Because of these tolerances, the output of zero current window detector 118 indicates only that load current has reached a low value, not that it has reached a zero value. Consequently, the reversal delay circuit 118 is included to reduce the detection uncertainty based upon the assumption that current to load 106 will continue to decrease after coming within the range of zero current window detector 118 and will actually reach zero after a certain delay period has expired. Unfortunately, this delay increases the overall reversing time and decreases system efficiency. Further, a safe delay period is dependent, in part, on the circuit tolerances as well as upon the inductance of load 106, as set forth above. Therefore, an adjustment to the reversal delay circuit 118 is often provided to achieve an installation-related compromise delay period that yields acceptably smooth transfer of control between bridges without blowing fuses due to bridge faults. Nonetheless, the delay time may have to be adjusted periodically as the circuit ages. The zero point of current transducer 116 may also have to be adjusted periodically due to offset drift in current sensor 114.

In order to overcome the inaccuracies and inefficiencies of the prior art, the method of the present invention provides a novel method for determining the load zero current level using only the measured line to line voltages ($V_{ab}$, $V_{ac}$, $V_{bc}$) at the input of the converter which are already necessary for line synchronization, the bridge output voltage conventionally necessary for voltage linearization and control, and the time of cell firing. In the manner set forth in detail below, the controller is made aware, substantially instantaneously, of a zero current level and switches the direction of the power accordingly without deleterious delay or damaging fault conditions.

Because the preferred controller is digital in nature, there is a necessary delay between the time that the received signals are measured and the actual instant when the particular thyristor is actually fired. This delay is preferably considered in the zero current level detection method and is the main factor limiting the maximum bandwidth achievable for a given controller sampling time.

Figure 2:
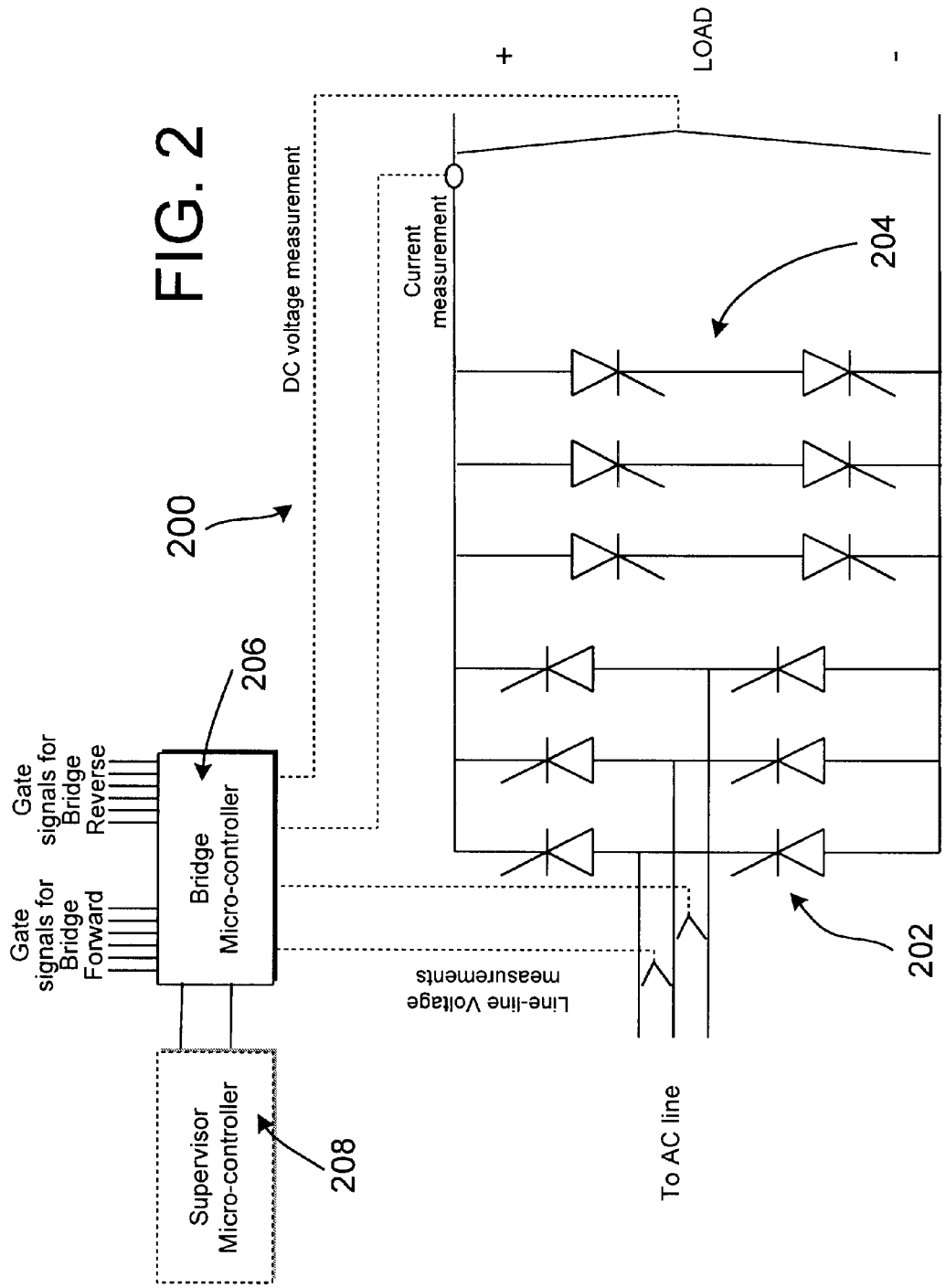
FIG. 2 is block diagram illustrating a power converter incorporating the inventive zero current level detection system.

Referring now to FIG. 2, there is shown a block diagram illustrating a power conversion apparatus incorporating one embodiment of the zero current level detection system of the present invention. In particular, forward and reversing thyristor bridges 202 and 204 are connected between an AC source (either a single or a polyphase source) and a load in the manner described above. Bridge firing controller 206 and supervisor controller 208 are electronically connected to the system for controlling the firing of the bridges 202 and 204. In accordance with one embodiment of the present invention, the bridge firing controller 206 receives signals from the system indicative of the bridge output voltage, the current window measurement, and the line to line input voltages. Further, the bridge firing controller also receives signals indicative of the gate signals applied to each thryistor in bridges 202 and 204. In the manner set forth in detail below, the bridge firing control utilizes these signals to accurately and quickly determine zero current level occurrences in the system, thereby enabling safe and efficient reversal of current flow from one bridge to the other.

Figure 3:
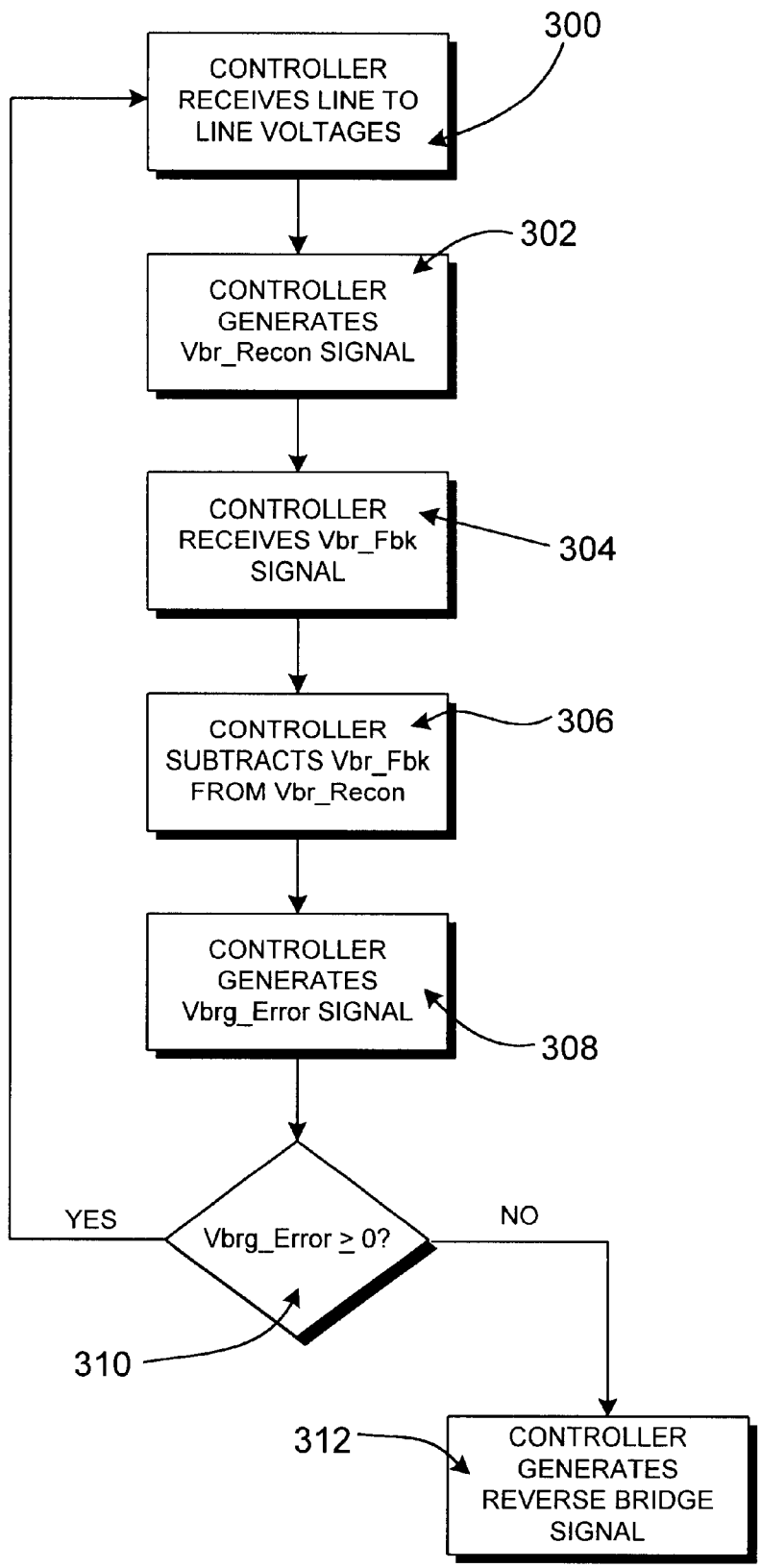
FIG. 3 is a flow chart illustrating one method of determining a zero current level occurrence in accordance with the present invention.

Referring now to FIG. 3, there is shown a flow chart describing a method for determining a load zero current level in accordance with the present invention. In step 300, a digital controller used to trigger the reversing of a power converter receives signals representing the measured line to line voltage for each phase of the input signal. As set forth above, these line to line voltage signals are conventionally received by the controller to assist in line synchronization. In step 302, the controller uses the measured voltages to generate a reconstructed the bridge output voltage signal $V_{br\_Recon}$ in light of the phase of the PLL angle generated above and the timing of the cell firing. In a preferred embodiment, the reconstructed bridge voltage consists of one of the three line to line voltages (or its inverse if the second thyristor in the pair is conducting) present in a three phase system, selected based on which pair of thyristors that have been most recently been commanded to fire by the controller. The particular method for selecting which of the line to line voltages to use is set forth in more detail below. In step 304, the controller receives a signal $V_{brg\_Fbk}$ representative of the actual bridge output voltage.

Once the controller has generated the $V_{br\_Recon}$ signal and received the $V_{brg\_Fbk}$ signal, the controller, in step 306, subtracts the $V_{brg\_Fbk}$ signal from the $V_{br\_Recon}$ signal. Next, the controller generates, in step 308, a bridge voltage error signal $V_{brg\_Error}$ equal to the difference between the two signals, inverted where necessary. Regarding this inversion step, it should be understood that the sign of the $V_{brg\_Error}$ signal is dependent upon the direction of current flow through the system. During forward bridge conduction, the $V_{brg\_Error}$ signal is predominantly positive and, during reverse bridge conduction, the $V_{brg\_Error}$ signal is predominantly negative. The effect of this sign change will be described in further detail below. In step 310, the controller determines whether the $V_{brg\_Error}$ signal is positive or negative in value. For forward bridge conduction, due to cell commutation effects generally caused by short duration short circuits, or voltage notches, occurring during cell commutation, not present in the reconstructed bridge voltage signal which typically render the actual bridge output voltage lower than the reconstructed bridge voltage, the error signal $V_{brg\_Error}$ is generally either positive or zero when a current exists in the load. Similarly, during reverse bridge conduction, these cell commutation effects generally result in a negative or zero $V_{brg\_Error}$ signal when a current exists in the load. The moment that the load current becomes zero, i.e., the bridge is no longer conducting, the load voltage (this would be the induced back electromotive force, or BEMF, in the case of an active load such as a motor) appears at the output of the bridge rather than on one of the line to line voltages as it would be if the bridge were conducting. Accordingly, the resulting $V_{brg\_Error}$ signal immediately changes indicating a zero current level. This change in load voltage is substantially instantaneous and its detection is limited only by the sampling rate of the controller, thereby avoiding deleterious delays present in prior protection systems. One method for simplifying the programming or hardware logic associated with the controller to account for changes in bridge direction includes inverting the $V_{brg\_Error}$ signal upon reverse bridge conduction. In this manner, $V_{brg\_Error}$ signal is consistently non-negative for non-zero load currents and becomes negative during zero current level occurences, regardless of power flow direction. Unlike prior measuring systems, the value of the $V_{brg\_Error}$ signal is not affected by either the amount of inductance in the load or the back electromotive force of the motor. Rather, the predominant source of error present in the $V_{brg\_Error}$ signal is simply due to voltage drop across the thyristor. Accordingly, these errors may be compensated for by measuring the amplitude of the voltage drops during preliminary self-tuning of the system.

If the controller, in step 310, determines that the $V_{brg\_Error}$ signal is positive, the controller returns to step 300 where another sampling is taken. If however, the controller determines that the $V_{brg\_Error}$ signal is negative, the controller generates a ZERO CURRENT LEVEL OCCURRENCE signal, in step 312, indicating that the load current has reached a zero level and that it is safe to fire the non-conducting reversing thyristor bridge, thereby reversing the flow of power in the system.

In accordance with the present invention, additional safeguards may also be implemented to ensure that a zero current level has been reached. In particular, in a preferred embodiment of the present invention, it may be required by the controller that, prior to triggering the reversal of the converter, any or all of the following conditions are met: 1) the direction of current commanded by the controller is opposite to the direction of current measured by the controller (i.e., a converter reversal has been commanded); 2) the bridge voltage error signal $V_{brg\_Error}$ is negative in value and has at least a predetermined amplitude; 3) the measured load current is below a minimum level (this condition is similar to the zero current window requirement found in the prior art); and 4) that conditions 2 and 3 are TRUE for at least two consecutive samplings, thereby protecting the system against spurious or erroneous signals caused by noise, interference, and the like.

Figure 4:
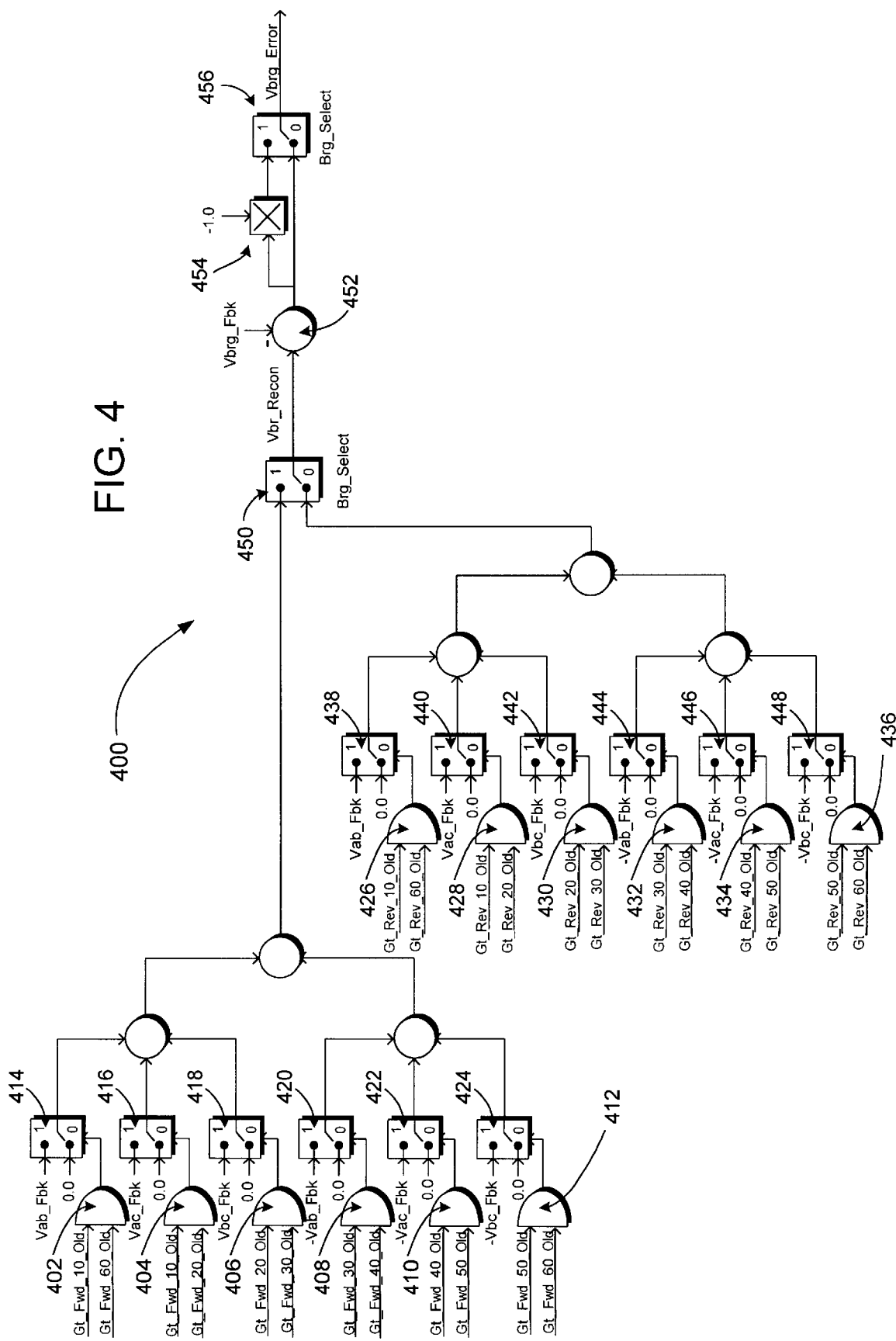
FIG. 4 is a logic diagram illustrating one embodiment of a method for determining the $V_{br\_Recon}$ signal and generating an associated $V_{brg\_Error}$ signal identified in FIG. 4.

Referring now to FIG. 4, there is shown a logic diagram 400 illustrating one embodiment of a method for determining the $V_{br\_Recon}$ signal and generating an associated $V_{brg\_Error}$ signal. It should be understood that the logic illustrated in diagram 400 may be incorporated into either controller hardware or controller software in a manner well known in the art. As described above, the controller of the present invention determines which of the three line to line voltage signals ($V_{ab}$, $V_{ac}$, and $V_{bc}$) should be used as the reconstructed bridge voltage signal $V_{br\_Recon}$. In accordance with this requirement the controller of the present invention receives feedback signals and their inverses ($V_{ab\_Fbk}$, $V_{ac\_Fbk}$, $V_{bc\_Fbk}$, $-V_{ab\_Fbk}$, $-V_{ac\_Fbk}$, and $-V_{be\_Fbk}$) representative of the line to line voltages supplied to each thyristor pair in the bridge. It should be understood that the inverse feedback signals represent the line to line voltages during the second half of the phase.

The controller also receives gate signals (Gt_Fwd_10_Old, Gt_Fwd_20_Old, Gt_Fwd_30_Old, Gt_Fwd_40_Old, Gt_Fwd_50_Old, Gt_Fwd_60_Old, Gt_Rev_10_Old, Gt_Rev_20_Old, Gt_Rev_30_Old, Gt_Rev_40_Old, Gt_Rev_50_Old, and Gt_Rev_60_Old) indicative of the gate signal most recently applied to the gate elements of each of the 12 thyristors present in both the forward bridge and the reverse bridge. Each of the gate signals are logic signals indicating the presence or absence of a firing command to the particular thyristor with either a high or low gate signal, respectively. It should be understood that each of the gate signals have been delayed by the controller to synchronize the gate signals with the measured line to line voltages.

In making the $V_{br\_Recon}$ signal determination, the controller applies the following logic to the gate signals of each thyristor. Firing detection logic for the forward bridge comprises a plurality of AND gates 402, 404, 406, 408, 410 and 412, each having a pair of inputs coupled to a pair of gate signals corresponding to each thyristor coupling: 1 and 2, 2 and 3, 3 and 4, 4 and 5, 5 and 6, and 6 and 1. The output from gates 402–412 are coupled to logic switches 414, 416, 418, 420, 422 and 424, respectively. Each AND gate 402–412 outputs a logic state signal to its associated logic switch 414–424 indicating the result of the ANDing operation. A high logic state signal (i.e., 1) will be generated by a particular AND gate 402–412 only if a high gate signal is present at both of the thyristors in the pair. Otherwise, AND gates 402–412 will generate a low logic state signal (i.e., 0). For every AND gate 402–412 which generates a low logic state signal, the corresponding logic switch 414–424 returns a 0.0 V signal. However, if an AND gate generates a high logic state signal, the corresponding switch returns the line voltage feedback signal associated with conducting thyristor pair.

Similar firing detection logic is provided for the reverse bridge and comprises a plurality of AND gates 426, 428, 430, 432, 434 and 436 and corresponding logic switches 438, 440, 442, 444, 446 and 448. In the manner set forth above for the forward bridge, the AND gates receive gate signals representative of the application of high or low gate signals to the gate elements of each thyristor pair. If both thyristors in a pair have high gate signals, a high logic state is provided to the corresponding logic switch and the switch returns the line voltage feedback signal associated with the pair.

A Brg_Select logic switch 450 is provided with the line to line voltage feedback outputs from both the forward and reverse bridges. Since only one bridge and one pair of thyristors in that bridge will be conducting at any given time (except during a fault condition), the Brg_Select switch 450 operates to select the line to line voltage feedback output signal having the non-zero value. This signal is then passed through as the $V_{br\_Recon}$ signal described above. Next, a $V_{brg\_Fbk}$ signal representative of the actual bridge output voltage is subtracted from the $V_{br\_Recon}$ signal in adder 452. The resulting signal is output as the $V_{brg\_Error}$ signal used by the controller to determine the zero current level in manner described in detail above. As described above, since to the sign of the natural $V_{brg\_Error}$ signal reverses upon conduction by the reverse bridge, it is necessary to account for this reversal.

In one embodiment of the present invention, the output of adder 452 is inverted by signal inverter 454. Upon reversal of the current flow, the controller operates to switch logic switch 456 between a forward bridge state (0) and a reverse bridge state (1), thereby causing the inverted output of adder 452 to become the $V_{brg\_Error}$ signal.

Figure 5:
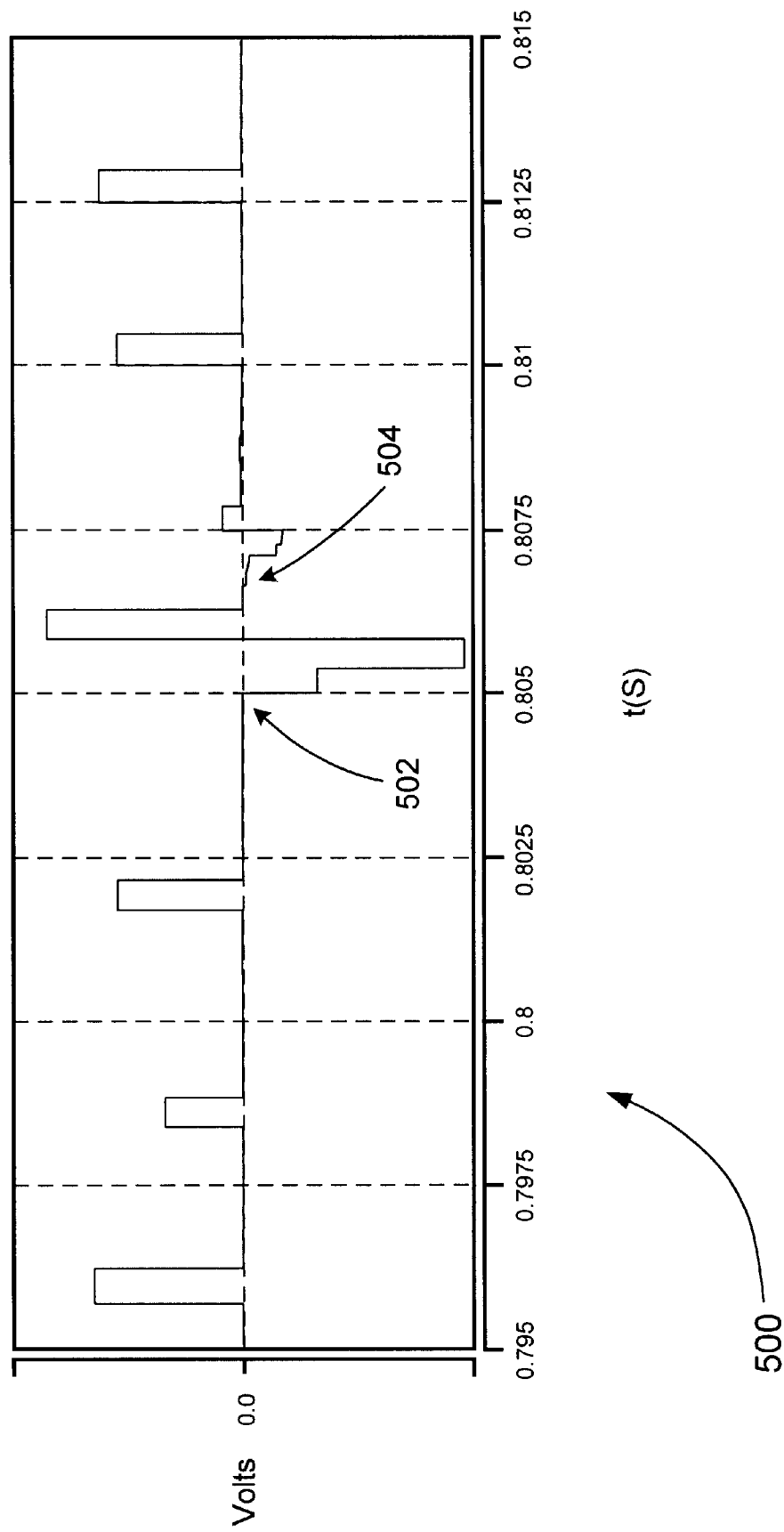
FIG. 5 is an exemplary graph of the bridge error voltage versus time depicting two distinct zero current level occurrences.

Referring now to FIG. 5, there is shown a $V_{brg\_Error}$ versus time graph 500 illustrating two distinct zero current level occurrences 502 and 504. As described above, the $V_{brg\_Error}$ signal is positive in value except when the load current equals zero. At this time, the $V_{brg\_Fbk}$ increases in value due to the appearance of the load voltage at the output of the bridge rather than on one of the line to line voltages as it would be if the bridge were conducting. The increase in the $V_{brg\_Fbk}$ signal over the $V_{br\_Recon}$ signal renders the $V_{brg\_Error}$ signal negative, thereby indicating that a reversal of power direction may be safely made.

By providing an accurate and time efficient system and method for determining zero current level occurrences in a reversible power converter without requiring additional component complexity and costs, the present invention safely enables reversing power flow without the risk of line faults due to cross-bridge short circuits. In the manner set forth above, by utilizing a selected one of the line to line voltages to reconstruct the bridge output voltage and comparing this voltage against the actual bridge output voltage, and error signal is generated which positively and instantaneously indicates zero current level occurrences, thereby avoiding the problems and disadvantages of the prior art.

It should be understood that, although the zero current level detection system of the present invention has been described in relation to current reversal in DC bridges including SCR's, the same method is also applicable to the control of SCR bridges in cycloconverters wherein multiple reversing DC bridges are utilized to generate AC voltages for control of AC loads such as motors, generators, and the like.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

We claim:

1. A method for detecting zero current level occurrences in a power converter having at least two thyristor bridges for enabling a reversal of power flow between a source and a load, comprising the steps of:

receiving a plurality of line to line voltage signals, one for each phase of an input signal;

generating a reconstructed bridge voltage signal based upon a selected one of said plurality of line to line voltage signals;

receiving an actual bridge voltage signal representing an actual measured bridge voltage;

comparing said reconstructed bridge voltage signal to said actual bridge voltage signal;

generating a bridge voltage error signal based upon said comparison;

determining the sign of said bridge voltage error signal; and generating a zero current level occurrence signal if the sign of said bridge voltage error signal matches a predetermined sign.

2. The method of claim 1, further comprising the step of receiving a load current signal from a current sensor, indicating generally, the value of the load current in the converter.

3. The method of claim 2, further comprising the step of generating a within zero current window signal when said load current signal falls within a predetermined current window.

4. The method of claim 3, further comprising the steps of:

receiving a reverse bridge command to reverse the direction of power flow between the source and the load; and reversing said direction of power flow only upon receipt of said zero current level occurrence signal and said within zero current window signal.

5. The method of claim 3, further comprising the steps of:
determining an amplitude of said bridge voltage error signal;
comparing said determined amplitude against a predetermined amplitude; and
generating a sufficient amplitude signal if said determined amplitude meets or exceeds said predetermined amplitude.

6. The method of claim 5, further comprising the steps of:
receiving a reverse bridge command to reverse the direction of power flow between the source and the load; and
reversing said direction of power flow only upon receipt of said zero current level occurrence signal, said within zero current window signal, and said sufficient amplitude signal.

7. The method of claim 5, further comprising the step of measuring each of said plurality of line to line voltage signals, said actual bridge voltage signal, and said load current signal at a predetermined sampling rate.

8. The method of claim 7, further comprising the steps of:
receiving a reverse bridge command to reverse the direction of power flow between the source and the load; and
reversing said direction of power flow only upon receipt of each of said zero current level occurrence signal, said within zero current window signal, and said sufficient amplitude signal in at least two consecutive samplings.

9. The method of claim 1, wherein the step of generating a reconstructed bridge voltage signal based upon a selected one of said plurality of line to line voltage signals further comprises the steps of:
receiving a plurality of gate signals for each of a plurality of thryistors included in said at least two thyristor bridges, wherein said gate signals include high gate signals and low gate signals, and wherein said plurality of thyristors in each of said thyristor bridges are coupled to each adjacent thyristor to form a plurality of thyristor pairs;
associating particular line to line voltage signals with each of said plurality of thyristor pairs based upon the phase of the current conducted therethrough;
determining a conducting thyristor pair based upon said received gate signals; and
identifying as the reconstructed bridge voltage signal the particular line to line voltage signal associated with said conducting thyristor pair.

10. The method of claim 9, further comprising the steps of:
receiving said gate signals into a plurality of AND gates, wherein each of said plurality of AND gates is associated with a particular thyristor pair;
outputting a logic state signal from each of said plurality of AND gates to a plurality of associated logic switches;
receiving into said plurality of logic switches, said line to line voltage signals associated with said particular thyristor pair;
generating a high logic state signal from each of said AND gates only when a high gate current signal is received from both of said thyristors in the associated thyristor pair, thus indicating the conducting thyristor pair; and
outputting, upon receipt of a high logic state signal, a signal representative of the particular line to line voltage signal associated with the conducting thyristor pair from said associated logic switch.

11. A power converter for controlling the flow of power between a source and a load including at least two thyristor bridges and a controller for reversing a power flow between a source and a load, wherein the controller comprises:
a plurality of inputs for receiving a plurality of line to line voltage signals, one for each phase of an input signal;
logic means for generating a reconstructed bridge voltage signal based upon a selected one of said plurality of line to line voltage signals;
a input for receiving an actual bridge voltage signal representing an actual measured bridge voltage;
processing means from comparing said reconstructed bridge voltage signal to said actual bridge voltage signal;
processing means for generating a bridge voltage error signal based upon said comparison;
processing means for determining the sign of said bridge voltage error signal; and
processing means for generating a zero current level occurrence signal if the sign of said bridge voltage error signal matches a predetermined sign.

12. The controller of claim 11, further comprising an input for receiving a load current signal from a current sensor, wherein the load current signal indicates generally, the value of the load current in the converter.

13. The controller of claim 12, further comprising processing means for generating a within zero current window signal when said load current signal falls within a predetermined current window.

14. The controller of claim 13, further comprising:
an input for receiving a reverse bridge command to reverse the direction of power flow between the source and the load; and
processing means for reversing said direction of power flow only upon receipt of said zero current level occurrence signal and said within zero current window signal.

15. The controller of claim 13, further comprising:
processing means for determining an amplitude of said bridge voltage error signal;
processing means for comparing said determined amplitude against a predetermined amplitude; and
processing means for generating a sufficient amplitude signal if said determined amplitude meets or exceeds said predetermined amplitude.

16. The controller of claim 15, further comprising:
an input for receiving a reverse bridge command to reverse the direction of power flow between the source and the load; and
processing means for reversing said direction of power flow only upon receipt of said zero current level occurrence signal, said within zero current window signal, and said sufficient amplitude signal.

17. The controller of claim 15, further comprising processing means for measuring each of said plurality of line to line voltage signals, said actual bridge voltage signal, and said load current signal at a predetermined sampling rate.

18. The controller of claim 17, further comprising:
an input for receiving a reverse bridge command to reverse the direction of power flow between the source and the load; and processing means for reversing said direction of power flow only upon receipt of each of said zero current level occurrence signal, said within zero current window signal, and said sufficient amplitude signal in at least two consecutive samplings.

19. The controller of claim 11, wherein the processing means for generating a reconstructed bridge voltage signal based upon a selected one of said plurality of line to line voltage signals further comprises:

processing means for receiving a plurality of gate signals for each of a plurality of thryistors included in said at least two thyristor bridges, wherein said plurality of gate signals include high gate signals and low gate signals, and wherein said plurality of thyristors in each of said thyristor bridges are coupled to each adjacent thyristor to form a plurality of thyristor pairs;

processing means for associating particular line to line voltage signals with each of said plurality of thyristor pairs based upon the phase of the current conducted therethrough;

processing means for determining a conducting thyristor pair based upon said received gate signals; and processing means for identifying, as the reconstructed bridge voltage signal, the particular line to line voltage signal associated with said conducting thyristor pair.

20. The controller of claim 19, further comprising:

a plurality of AND gates for receiving said gate signals, wherein each of said plurality of AND gates is associated with a particular thyristor pair; and a plurality of associated logic switches for receiving outputted logic state signals from each of said plurality of AND gates,
   wherein said plurality of logic switches receive said line to line voltage signals associated with said particular thyristor pair,
   wherein said plurality of AND gates generate a high logic state signal from each of said AND gates only when a high gate signal is received from both of said thyristors in the associated thyristor pair, thus indicating the conducting thyristor pair, and
   wherein each of said plurality of logic switches outputs, upon receipt of a high logic state signal, a signal representative of the particular line to line voltage signal associated with the conducting thyristor pair.

* * * * *